(12) United States Patent
Ishitoko et al.

(10) Patent No.: US 6,281,618 B1
(45) Date of Patent: Aug. 28, 2001

(54) VIBRATING GYROSCOPE

(75) Inventors: Nobuyuki Ishitoko, Toyama; Katsumi Fujimoto, Toyama-ken, both of (JP)

(73) Assignee: Murata Manufactuirng Co., Ltd. (JP)

( * ) Notice: Subject to any disclaimer, the term of this patent is extended or adjusted under 35 U.S.C. 154(b) by 0 days.

(21) Appl. No.: 09/550,872

(22) Filed: Apr. 17, 2000

(30) Foreign Application Priority Data

Apr. 22, 1999 (JP) .................................................. 11-114744

(51) Int. Cl.$^7$ ..................................................... H01L 41/08
(52) U.S. Cl. .................. 310/329; 310/321; 310/330; 310/366; 73/505.12
(58) Field of Search ............................ 310/321, 323.01, 310/329, 316.01, 330, 331, 332, 366; 73/505.12, 505.14, 505.15, 505.16

(56) References Cited

U.S. PATENT DOCUMENTS 4,703,287 * 10/1987 Fournier, Jr. et al. ............... 332/7.51
6,058,777 * 5/2000 Fujimoto et al. .................. 73/504.12
6,089,087 * 7/2000 Fujimoto et al. ................. 310/330 R
6,116,086 * 9/2000 Fujimoto .............................. 310/329

FOREIGN PATENT DOCUMENTS 0717263   6/1996  (EP) .
0860685   8/1998  (EP) .
9184726   7/1997  (JP) .

* cited by examiner

*Primary Examiner*—Mark O. Budd
(74) *Attorney, Agent, or Firm*—Ostrolenk, Faber, Gerb & Soffen, LLP

(57) ABSTRACT

A vibrating gyroscope includes two planar vibrating plates arranged to oppose each other. The two vibrating plates vibrate under buckling vibration mode and a second-order bending vibration mode which is degenerated with or close to the buckling vibration mode. The vibrating gyroscope detects Coriolis force by detecting displacements in amplitude balance of the second-order bending vibration modes generated when an angular rotation velocity around an axis parallel to surfaces of the vibrating plates is applied.

10 Claims, 12 Drawing Sheets

1

VIBRATING GYROSCOPE

BACKGROUND OF THE INVENTION

1. Field of the Invention

The present invention relates to a vibrating gyroscope, and more particularly to a vibrating gyroscope used, for example, to detect angular velocities for prevention of camera shake.

2. Description of the Related Art

FIG. 11 is a perspective view of an example of a conventional vibrating gyroscope. A vibrating gyroscope 1 includes a vibrating body 2 in, for example, the shape of a regular triangle. As seen in FIGS. 11 and 12, three peripheral surfaces of the vibrating body 2 have piezoelectric elements 3a, 3b, and 3c, respectively. To use the vibrating gyroscope 1, as shown in FIG. 12, for example, a vibration circuit 4 is connected between the piezoelectric elements 3a and 3b and the piezoelectric element 3c. Also, the piezoelectric elements 3a and 3b are connected to a detection circuit 5. The detection circuit 5 includes, for example, a differential circuit, a synchronous detection circuit, a smoothing circuit, and a DC amplifying circuit.

In the vibrating gyroscope 1, a signal outputted from the piezoelectric element 3c is returned to the vibration circuit 4. The vibration circuit 4 amplifies the returned signal and compensates the amplified signal in phase, thereby forming an exciting signal. The exciting signal thus obtained is fed to the piezoelectric elements 3a and 3b. This causes the vibrating body 2 to perform bending vibrations in the direction perpendicular to the surface where the piezoelectric element 3c is formed. In this state, bending states of the piezoelectric elements 3a and 3b are the same, and signals outputted therefrom are also the same. Therefore, no signal is outputted from the differential circuit in the detection circuit 5. In a state where the vibrating body 2 is in bending vibration, rotation about an axis of the vibrating body 2 in the center generates a Coriolis force, thereby changing the vibration direction of the vibrating body 2. This causes a difference between signals outputted from the piezoelectric elements 3a and 3b, and causes the differential circuit to output a signal. The output signal is then smoothed in the smoothing circuit, and the smoothed signal is amplified in the DC amplifying circuit. Therefore, measuring a signal outputted from the detection circuit 5 allows an angular rotation velocity to be detected.

For a vibrating gyroscope 1 shown in FIG. 13, a vibrating body 2 may be manufactured by coupling two piezoelectric substrates 6a and 6b. As indicated by arrows in FIG. 13, the piezoelectric substrates are polarized so as to oppose each other. In this case, electrodes 7a and 7b each extending in the length direction are formed on one of opposing surfaces of the vibrating body 2, and an electrode 8 is formed on the entire surface of the other opposing surfaces thereof. Using the circuits shown in FIG. 12, the described vibrating gyroscope 1 also allows the angular velocity to be detected.

Nevertheless, with each of the vibrating gyroscopes described above, only the angular velocity about the axis of the vibrating body in the center can be detected, and only the angular velocity with respect to a single direction can be detected. Therefore, two units of the vibrating gyroscopes are required to detect angular velocities in two directions, and two vibration circuits are required to excite these vibrating gyroscopes. The vibration circuit is expensive, thereby increasing costs to detect angular velocities in multiple directions.

In view of the forgoing reasons, there has been a demand for a vibrating gyroscope capable of detecting angular velocities with respect to two directions by using a single element.

SUMMARY OF THE INVENTION

The present invention is directed to a vibrating gyroscope that satisfies this need. The vibrating gyroscope comprises two planar vibrating plates arranged to oppose each other. The two vibrating plates vibrate under buckling vibration mode and a second-order bending vibration mode which is degenerated with or close to the buckling vibration mode. The vibrating gyroscope detects Coriolis force by detecting displacements in amplitude balance of the second-order bending vibration modes generated when an angular rotation velocity around an axis parallel to surfaces of the vibrating plates is applied.

The described vibrating gyroscope may comprise an intermediate member formed between the two vibrating plates to form a spaced section between the two vibrating plates, and a plurality of exciting and detecting elements formed on the vibrating plates to vibrate the vibrating plates and to output signals generated by vibrations of the vibrating plates, wherein a first detecting section is formed according to a combination for the two adjacent exciting and detecting elements, a second detecting section is formed according to another combination for the two adjacent exciting and detecting elements, and the first detecting section and the second detecting section are arranged perpendicular to each other.

In this case, it is preferable that the exciting and detecting elements are not formed in positions opposing to the intermediate member, and are formed in positions opposing to the spaced section.

Also, the individual exciting and detecting elements are formed of piezoelectric substrates, and electrodes sectioned crosswise into four are formed on the piezoelectric substrates, whereby the electrodes and the piezoelectric substrates may be used to form the exciting and detecting elements.

Also, the vibrating plate may be formed of a metal plate, and piezoelectric elements sectioned crosswise into four and formed on the vibrating plate may be used to form the exciting and detecting element.

In addition, the intermediate member may be formed of a frame member in which a through opening is formed in its central portion.

Furthermore, the intermediate member may be formed of multiple members arranged on multiple end portions of the vibrating plates.

For example, by feeding exciting signals to all the exciting and detecting elements, buckling vibration is generated such that the amplitude of each of central portions of the vibrating reaches the maximum. When the angular velocity with each of the axes parallel to surfaces of the vibrating plates in the center is applied, the Coriolis force varies vibration of the vibrating plate in the quadratic bending vibration mode. When the buckling vibration and the vibration in the quadratic bending vibration mode are either degenerated or arranged similar, a point where the amplitude of the vibrating plate reaches the maximum vibrates deviating from the central portion of the vibrating plate. For this reason, the difference is caused between bending states of two exciting and detecting elements constituting one of the first and second detecting sections, and a signal corresponding to the Coriolis force is outputted from one of the first and second detecting sections. Since the first and second detecting sections are arranged perpendicular to each other, signals corresponding to angular velocities about respect to two directions that are perpendicular to each other can be obtained.

Since the vibrating plates and the intermediate member are immobilized, the exciting and detecting elements are preferably arranged at positions opposing the spaced section. This arrangement is made to cause the buckling vibration so that the amplitude at the central portion of the vibrating plate reaches the maximum.

In the described vibrating gyroscope, the piezoelectric substrate may be used for the vibrating plate, and the piezoelectric substrates and the electrodes sectioned crosswise into four thereon may be used to form the exciting and detecting element.

Also, the metal plate may be used for each of the vibrating plates. In this case, the exciting and detecting element is formed by the four piezoelectric elements sectioned crosswise and formed on the vibrating plate.

Furthermore, the intermediate member is provided to form the spaced section between the vibrating plates opposing each other. Therefore, the intermediate member may be formed of either the frame member in which the through-opening is formed or the multiple members arranged at the multiple end portions of the vibrating plates.

According to the present invention, angular velocities with axes in two directions can be detected by a single vibrating gyroscope. Furthermore, since the vibrating gyroscope can be excited with a single vibration, cost reduction can be implemented, compared to conventional methods each using two vibrating gyroscopes.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Hereinafter, the preferred embodiments of the present invention are explained in detail with reference to the drawings.

Figure 1:
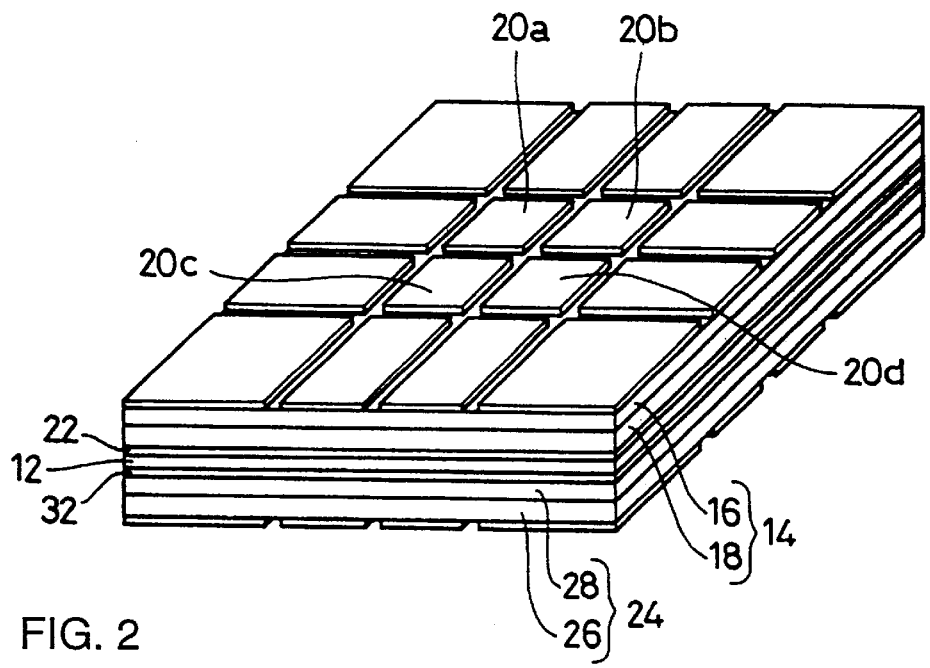
FIG. 1 is a perspective view of an example of a vibrating gyroscope according to the present invention.
Figure 2:
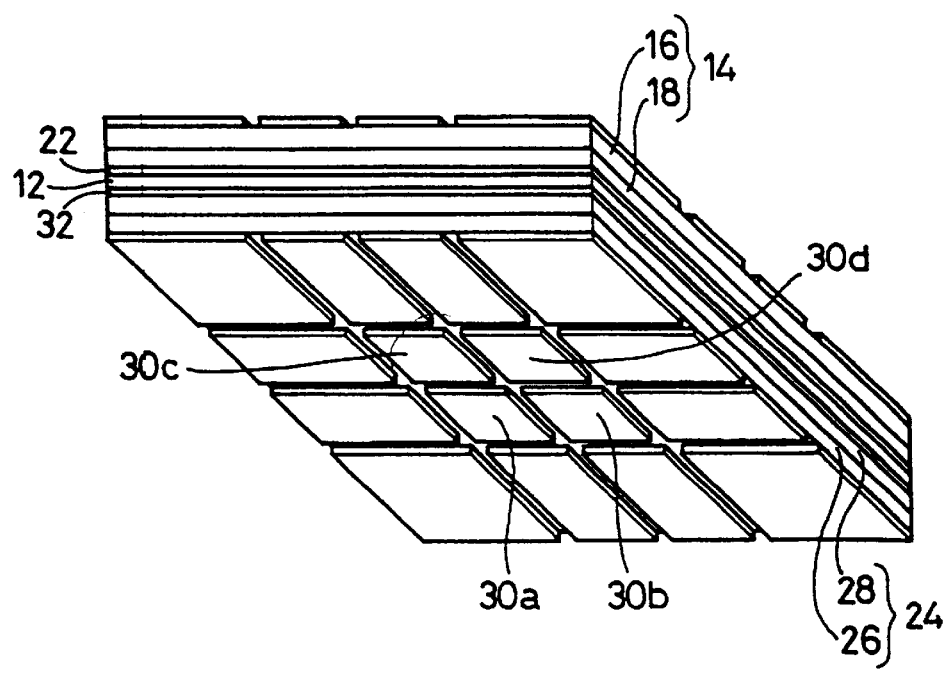
FIG. 2 is a perspective view taken at a different angle of the vibrating gyroscope in FIG. 1.
Figure 3:
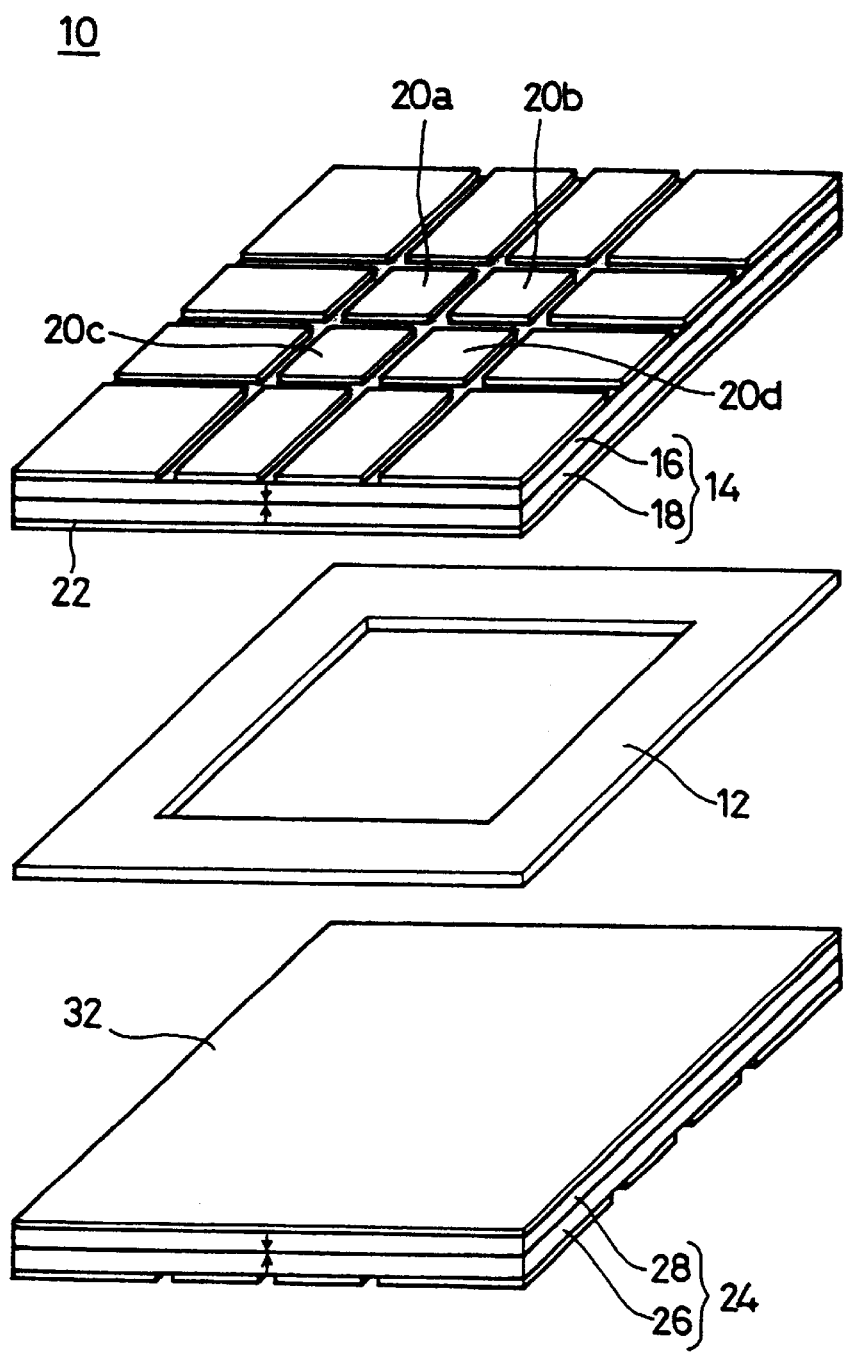
FIG. 3 is an exploded perspective view of the vibrating gyroscope in FIG. 1.

FIG. 1 is a perspective view showing an example of a vibrating gyroscope of the present invention. FIG. 2 is a perspective view taken at a different angle of the vibrating gyroscope shown in FIG. 1; and FIG. 3 is an exploded perspective view thereof. A vibrating gyroscope 10 includes an intermediate member 12. As shown in FIG. 3, the intermediate member 12 is formed in a frame shape having a through opening in its central portion. A vibrating plate 14 is formed on one of the opposing sides of the intermediate member 12. The vibrating plate 14 is formed, for example, by coupling piezoelectric substrates 16 and 18. As indicated by arrows in FIG. 3, the piezoelectric substrates 16 and 18 are polarized so as to oppose each other in the thickness direction.

On the piezoelectric substrate 16, there are formed 16 sectional electrodes, of which four electrodes 20a, 20b, 20c, and 20d are used to allow input and/or output of signals. These electrodes are formed by cutting a planar electrode by a dicer in a matrix. This forms the electrodes 20a, 20b, 20c, and 20d into crosswise sections. In the vibrating gyroscope 10, since the electrodes are formed in the manner described above, 16 electrodes are formed. However, the electrodes 20a, 20b, 20c, and 20d are required for the vibrating gyroscope 10, but other peripheral electrodes are not required. Therefore, when the electrodes 20a, 20b, 20c, and 20d are formed by printing on the piezoelectric substrate 16, the peripheral electrodes need not be formed. When the electrodes 20a, 20b, 20c, and 20d are formed by etching, the peripheral electrodes may be similarly eliminated. Also, a planar electrode 22 is formed on the piezoelectric substrate 18. These piezoelectric substrates 16 and 18, the electrodes 20a, 20b, 20c, and 20d, and planar electrode 22 form an exciting and detecting element.

Also, another vibrating plate 24 is formed on the other one of the opposing sides of the intermediate member 12. The vibrating plate 24 has a structure similar to that of the vibrating plate 14. The vibrating plate 24 includes piezoelectric substrates 26 and 28 that are coupled, and the piezoelectric substrates 26 and 28 are polarized so as to oppose each other. As best seen in FIG. 2, on the piezoelectric substrate 26, there are formed 16 sectional electrodes, of which electrodes 30a, 30b, 30c, and 30d in a central portion are used to allow input and/or output of signals. Also, a planar electrode 32 is formed on the piezoelectric substrate 28. The piezoelectric substrates 26 and 28, the electrodes 30a, 30b, 30c, and 30d, and planar electrode 32 form an exciting and detecting element.

The two vibrating plates 14 and 24 are arranged in such a manner as to sandwich the intermediate member 12; accordingly, a spaced section is formed between the vibrating plates 14 and 24. The electrodes 20a, 20b, 20c, and 20d and the electrodes 30a, 30b, 30c, and 30d that constitute the exciting and detecting elements are arranged in positions opposing the spaced section. This arrangement allows the vibrating plates 14 and 24 to efficiently perform buckling vibrations in response to exciting signals.

Figure 4:
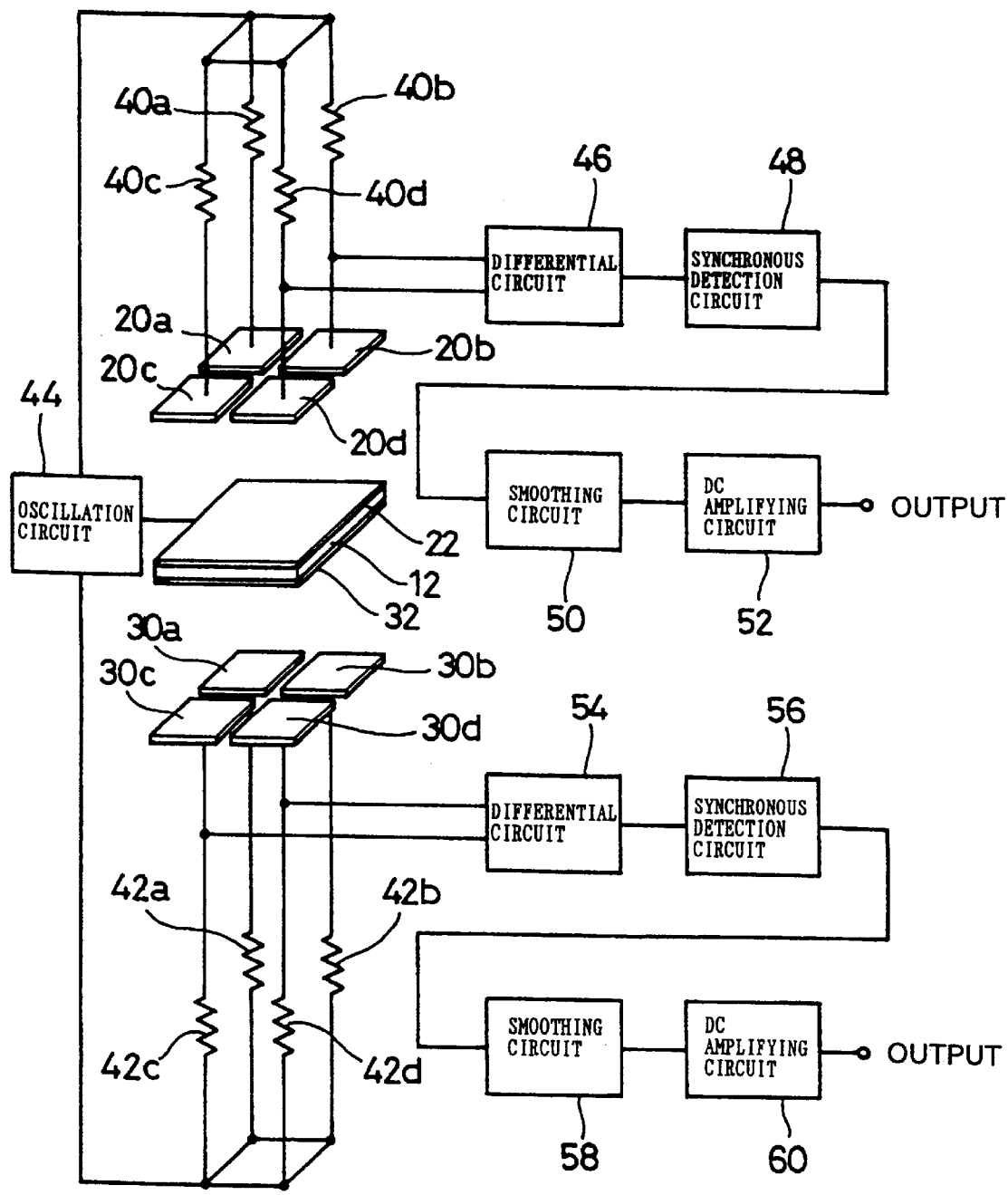
FIG. 4 is a schematic view of circuits used for the vibrating gyroscope in FIG. 1

Circuits shown in FIG. 4 are connected for use of the vibrating gyroscope 10. FIG. 4 shows only the electrodes 20a, 20b, 20c, and 20d, the electrodes 30a, 30b, 30c, planar electrodes 22 and 32, and the intermediate member 12 to show the relationship in connection between the individual electrodes and the circuits in the vibrating gyroscope 10. The individual planar electrodes 22 and 32 and the intermediate member 12 are shown in the same outline dimensions of those of each of the electrodes 20a, 20b, 20c, and 20d. Actually, however, they have the same outline dimensions as those of the vibrating plates 14 and 24, as shown in FIG. 1. The electrodes 20a, 20b, 20c, and 20d are connected to resistors 40a, 40b, 40c, and 40d, respectively. The electrodes 30a, 30b, 30c, and 30d are connected to resistors 42a, 42b, 42c, and 42d, respectively. A oscillation circuit 44 is formed between the resistors 40a, 40b, 40c, and 40d and the resistors 42a, 42b, 42c, and 42d.

To provide the above-described connections, a conductive material is applied onto partial areas or the entire area of the intermediate member 12. Thus, the intermediate member 12 is electrically connected to the planar electrodes 22 and 32; thereby, the planar electrodes 22 and 32 are connected to the oscillation circuit 44 via the intermediate member 12. As a material for the intermediate member 12, a material similar to a material for the vibrating plates 14 and 24 is preferable so as not to disturb vibrations of the vibrating plates 14 and 24. Accordingly, the intermediate member 12 can be formed by using the same material as that for the piezoelectric substrate 16, 18, 26, and 28, and by forming an electrode layer over the material. In this case, the planar electrodes 22 and 32 are electrically connected to the electrode layer. Alternatively, a high-elastic material may be used to form the intermediate member 12.

The two electrodes 20b and 20d that are adjacent to the side of the vibrating plate 14 are connected to a differential circuit 46. A signal outputted from the differential circuit 46 is detected in a synchronous detection circuit 48 in synchronization with, for example, a signal outputted from the vibration circuit 44. The signal detected in the synchronous detection circuit 48 is then smoothed in a smoothing circuit 50, and subsequently, is amplified in a DC amplifying circuit 52. Similarly, the two electrodes 30c and 30d that are adjacent to each other on the side of the vibrating plate 24 are connected to a differential circuit 54. A signal outputted from the differential circuit 54 is detected in a synchronous detection circuit 56 in synchronization with, for example, a signal outputted from the vibration circuit 44. The signal detected in the synchronization detector circuit 56 is then smoothed in a smoother circuit 58, and subsequently, is amplified in a DC amplifying circuit 60.

In the circuits shown in FIG. 4, the two electrodes 20b and 20d that are adjacent to each other form a first detecting section; and the two electrodes 30c and 30d that are adjacent to each other form a second detecting section. Although each of these first detecting section and second detecting section may be a combination of optional two electrodes that are adjacent to each other, electrodes constituting each of the first detecting section and the second detecting section must be selected to be those perpendicular to each other. Accordingly, when the electrodes 20b and 20d are selected for the first detecting section, the electrodes 30a and 30b may be selected as the second detecting section. Alternatively, an arrangement may be such that the electrodes 20c and 20d are selected, and the electrode 20d is shared by the first detecting section and the second detecting section.

Figure 5A:
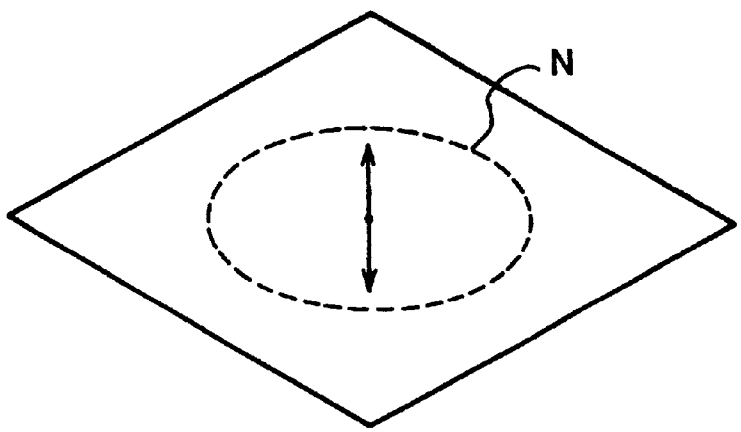
FIG. 5A is a finite element method (FEM) analysis view showing a vibration under buckling vibration mode of the vibrating gyroscope when it is not rotated.
Figure 5B:
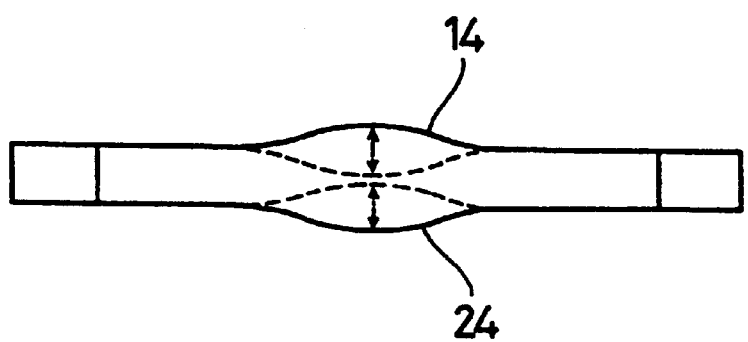
FIG. 5B is a cross-sectional view of the vibration.

The signals outputted from the planar electrode 22 and 32 are fed back to the vibration circuit 44. The feedback signals are amplified in the vibration circuit 44, and also, are compensated in phase, thereby forming exciting signals. These exciting signals are fed to the electrodes 20a, 20b, 20c, and 20d and the electrodes 30a, 30b, 30c, and 30d. According to the above, as shown in FIGS. 5A and 5B, the vibrating plates 14 and 24 vibrate under a buckling vibration mode in the opposing direction with each other such that each of the vibrating plates 14 and 24 vibrates, producing the maximum amplitude at its central portion. It is to be noted that the dotted line N indicates the node of vibration in FIG. 5A.

Figure 6A:
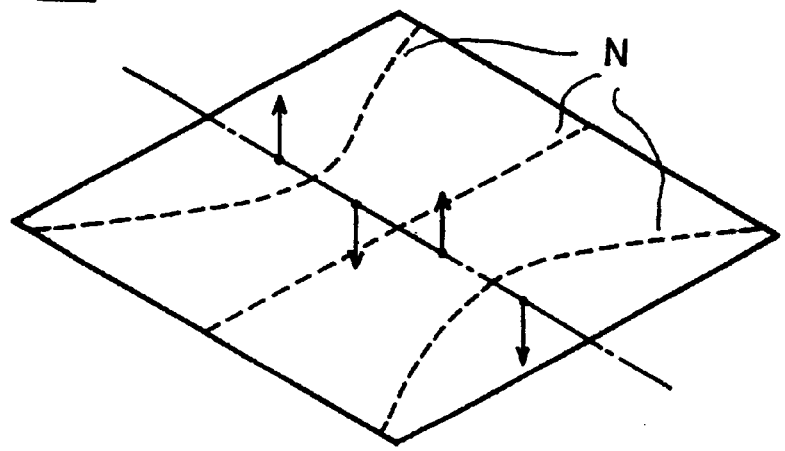
FIG. 6A is an FEM analysis view showing a vibration under a second-order bending vibration mode of the vibrating gyroscope when it is rotated.
Figure 6B:
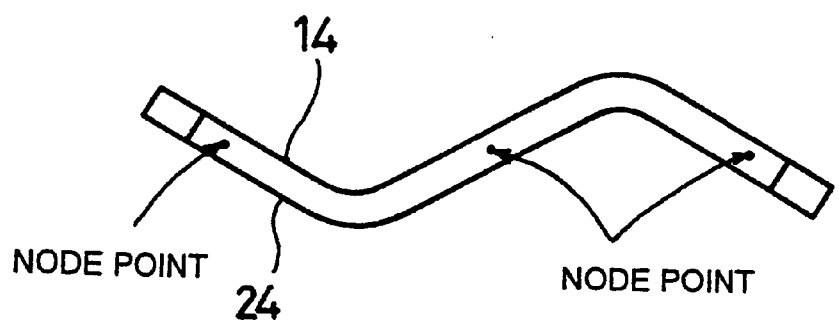
FIG. 6B is a cross-sectional view of the vibration state, taken along single-dotted lines in FIG. 6A.

At the time, it is preferable that a second-order bending vibration as shown in FIGS. 6A and 6B is also excited, and that the second-order bending vibration and the buckling vibration as explained above are degenerated so that detection sensitivity of the vibration gyroscope becomes the maximum. It is noted that another second-order bending vibration which is perpendicular to the second-order bending vibration mode shown in FIG. 6A is also excited. The buckling vibration mode and the second-order bending vibration mode can be degenerated by optimizing plate thicknesses, areas (outer dimensions), and the inner dimensions of the spaced section. As a matter of course, the sufficient high sensitivity can be obtained if the two vibration modes are close with each other, i.e., if the difference of resonance frequencies of the two vibration mode is within about 1% of the resonance frequency.

The described vibrations cause identical vibration states at portions of the piezoelectric substrates 16 and 18 where the electrodes 20a, 20b, 20c, and 20d are formed, causing signals outputted from the electrodes 20a, 20b, 20c, and 20d to be the same. Therefore, no signal is outputted from the differential circuit 54. This proves that no angular velocity is applied to the vibrating gyroscope 10.

Figure 7A:
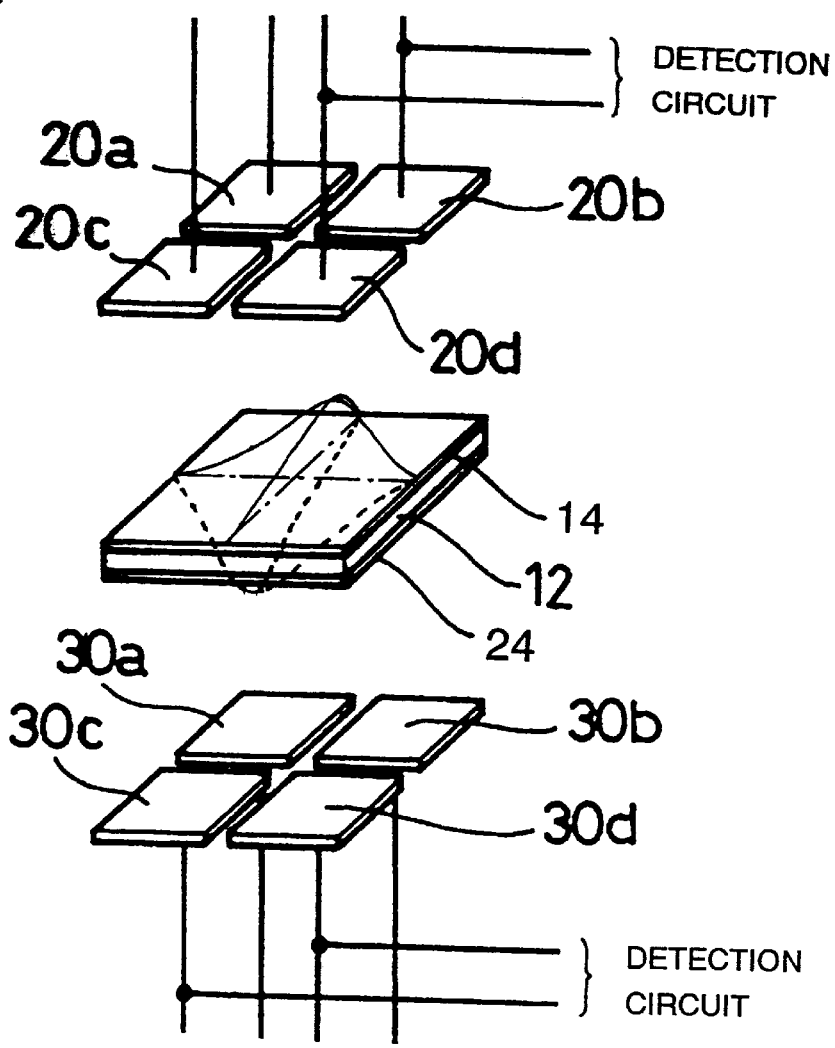
FIG. 7A is a schematic perspective view showing vibration of the vibrating palate of the vibrating gyroscope when the vibrating gyroscope is rotated.

In the described vibration states, when rotation is performed about an axis that is parallel to the vibrating plates 14 and 24 and that extends between the electrodes 20b and 20d constituting the first detecting section, a Coriolis force is generated due to an angular rotation velocity in the direction perpendicular to a vibration direction when it is not rotated, thereby causing the vibrating plates 14 and 24 to vary in vibration mode, as shown in FIG. 7A. Due to the Coriolis force, the maximum-amplitude position of the vibrating plates 14 and 24 deviate from central portions. At the same time, the second-order bending vibration mode that has been symmetric with respect to the center is influenced, and the degeneration of the buckling vibration and second-order bending vibration is resolved. This causes the difference between vibration states of the piezoelectric substrates 16 and 18, thereby causing the electrodes 20b and 20d to output different signals.

Displacement in the vibration states of the piezoelectric substrates 16 and 18 corresponds to the magnitude of the Coriolis force, so that variations in the signals outputted from the electrodes 20b and 20d correspond to Coriolis forces.

Figure 7B:
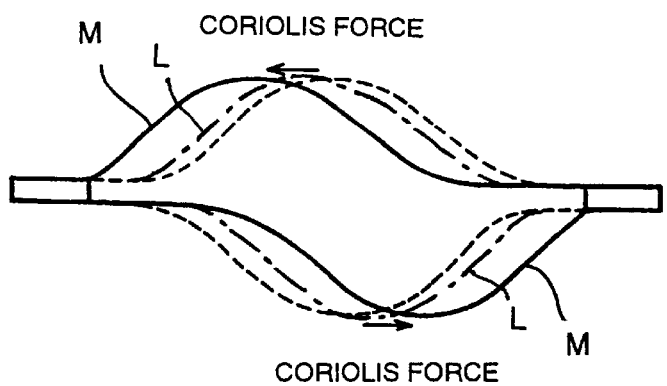
FIG. 7B is a cross-sectional view illustrating a vibration state when the Coriolis force is applied.

As shown by dotted line L in FIG. 7B, when the bucking vibration and the second-order bending vibration are not degenerated or close with each other, the displacement becomes small. On the contrary, as shown by line M in FIG. 7B when the bucking vibration and the second-order bending vibration are degenerated or close with each other, the displacement becomes great, so that variations in the signals outputted from the electrodes 20b and 20d also becomes large, thereby enhancing the detection sensitivity.

The aforementioned difference between the signals is outputted from the differential circuit 46. Since the signals outputted from the electrodes 20b and 20d correspond to Coriolis forces, large-level signals corresponding to variations, that is, Coriolis forces, can be obtained from the differential circuit 46. Each of the signals outputted from the differential circuit 46 is detected in synchronization with the signal outputted from the vibration circuit 44. According to this, only one of the positive side and the negative side of the output signal or a signal of which the positive side or the negative side is inverted is detected. The detected signal is smoothed in the smoothing circuit 50, and also, is amplified in the DC amplifying circuit 52. Since the signal outputted from the differential circuit 46 has a level corresponding to the Coriolis force, the level of the signal outputted from the DC amplifying circuit 52 also corresponds to the Coriolis force. In this case, the frequency of angular velocity can be detected according to the level of the signal outputted from the DC amplifying circuit 52. Also, when the direction of an angular velocity applied to the vibrating gyroscope 10 is reversed, the polarity of a signal detected in the synchronous detection circuit 48 is also reversed. Accordingly, the polarity of the signal outputted from the DC amplifying circuit 52 is also reversed. The polarity of the signal outputted from the DC amplifying circuit 52 serves to detect the direction of the angular velocity.

As shown in FIG. 7A, the Coriolis force is exerted in the direction opposing the vibrating plate 14 at the time, displacing vibration of the vibrating plate 24. However, since the vibration state varies in two sides of an axis extending between the electrodes 30b and 30d, signals outputted from the electrodes 30c and 30d also vary. Therefore, no signal is outputted from the differential circuit 54.

When the vibrating gyroscope 10 is rotated about with an axis that is parallel to the vibrating plates 14 and 24 and that extends between the electrodes 30c and 30d, similarly to the vibration states described above referring to FIGS. 5A, 5B, 6A, 6B and 6C, vibration states of the piezoelectric substrates 26 and 28 vary corresponding to Coriolis forces on the two sides of the axis. This causes the difference between signals outputted from the electrodes 30c and 30d, thereby causing the differential circuit 54 to detect the signal outputted from the differential circuit 54. Then, the signal is smoothed in the smoother circuit 58, and subsequently, is amplified in the DC amplifying circuit 60, thereby allowing detection of an angular velocity about the axis extending between the electrodes 30c and 30d in the center. At this time, since the piezoelectric substrates 16 and 18 formed in areas where the electrodes 20b and 20d on the side of the vibrating plate 14 also displace similarly to the above. Therefore, no signal is outputted from the differential circuit 46.

In this way, according to measurement of the signal outputted from the DC amplifying circuit 52, the angular velocity about the axis extending between the electrodes 20b and 20d in the center can be detected. Also, according to measurement of the signal outputted from the DC amplifying circuit 60, the angular velocity about the axis extending between the electrodes 30a, 30b, 30c, and 30d in the center can be detected. That is, according to the arrangement in which the first detecting section composed of the electrodes 20b and 20d is perpendicular to the second detecting section composed of the electrodes 30c and 30d, the angular velocity about each of the two axes perpendicular to each other in the center can be detected. Also, with only the single vibration circuit 44, the vibrating plates 14 and 24 can be excited to cause vibrations. Compared to conventional methods each using two oscillation circuits, the above-described method allows cost reduction to be implemented.

Figure 8:
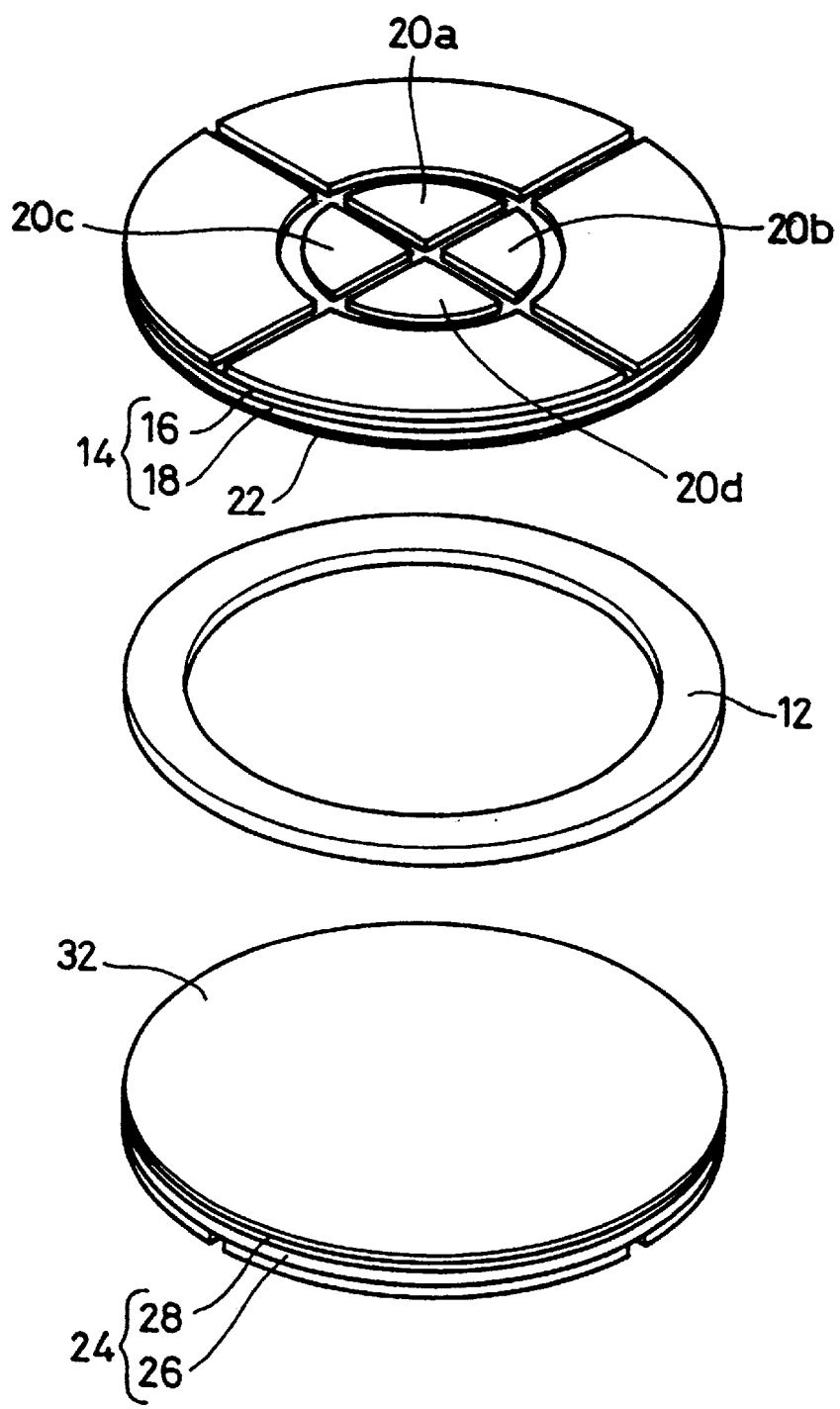
FIG. 8 is an exploded perspective view of another example of a vibrating gyroscope according to the present invention.

As shown in FIG. 8, each of the vibrating plates 14 and 24 may be in the shape of a circular disc. In this case, an intermediate member 12 is formed in the shape of a ring. Also, each of electrodes 20a, 20b, 20c, and 20d on the side of a vibrating plate 14, and each of electrodes 30a, 30b, 30c, and 30d on the side of a vibrating plate 24 is formed in the shape of an arcuate sector. In this case, peripheral electrodes around the electrodes 20a, 20b, 20c, and 20d, and peripheral electrodes around the electrodes 30a, 30b, 30c, and 30d do not work for operation of a vibrating gyroscope 10, so that they may be eliminated. The vibrating gyroscope 10 as described above is also capable of detecting the angular velocity with each of the two axes perpendicular each other by using the circuits shown in FIG. 4.

Figure 9:
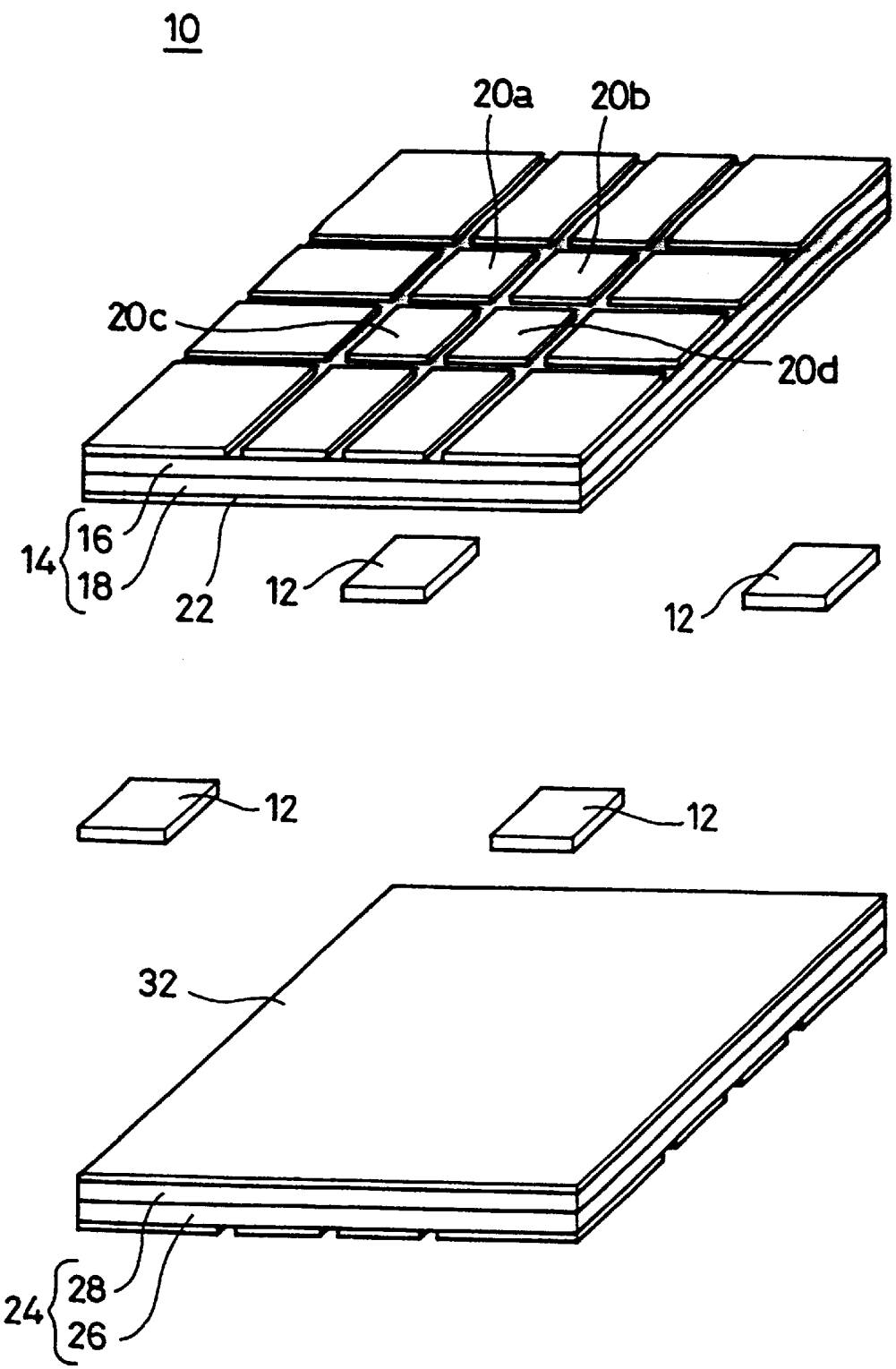
FIG. 9 is an exploded perspective view of still another example of a vibrating gyroscope according to the present invention.

As shown in FIG. 9, the intermediate member 12 need not be formed of a frame material having a through opening in its central portion, and may be formed at each of the four corners of the vibrating plates 14 and 24. Thus, all that is essentially required is a spaced section formed corresponding to the area where the electrodes 20a, 20b, 20c, and 20d and the electrodes 30a, 30b, 30c, and 30d that are used to allow input and/or output of signals. Therefore, the shape of the intermediate member 12 for forming the spaced section may be changed as required.

Figure 10:
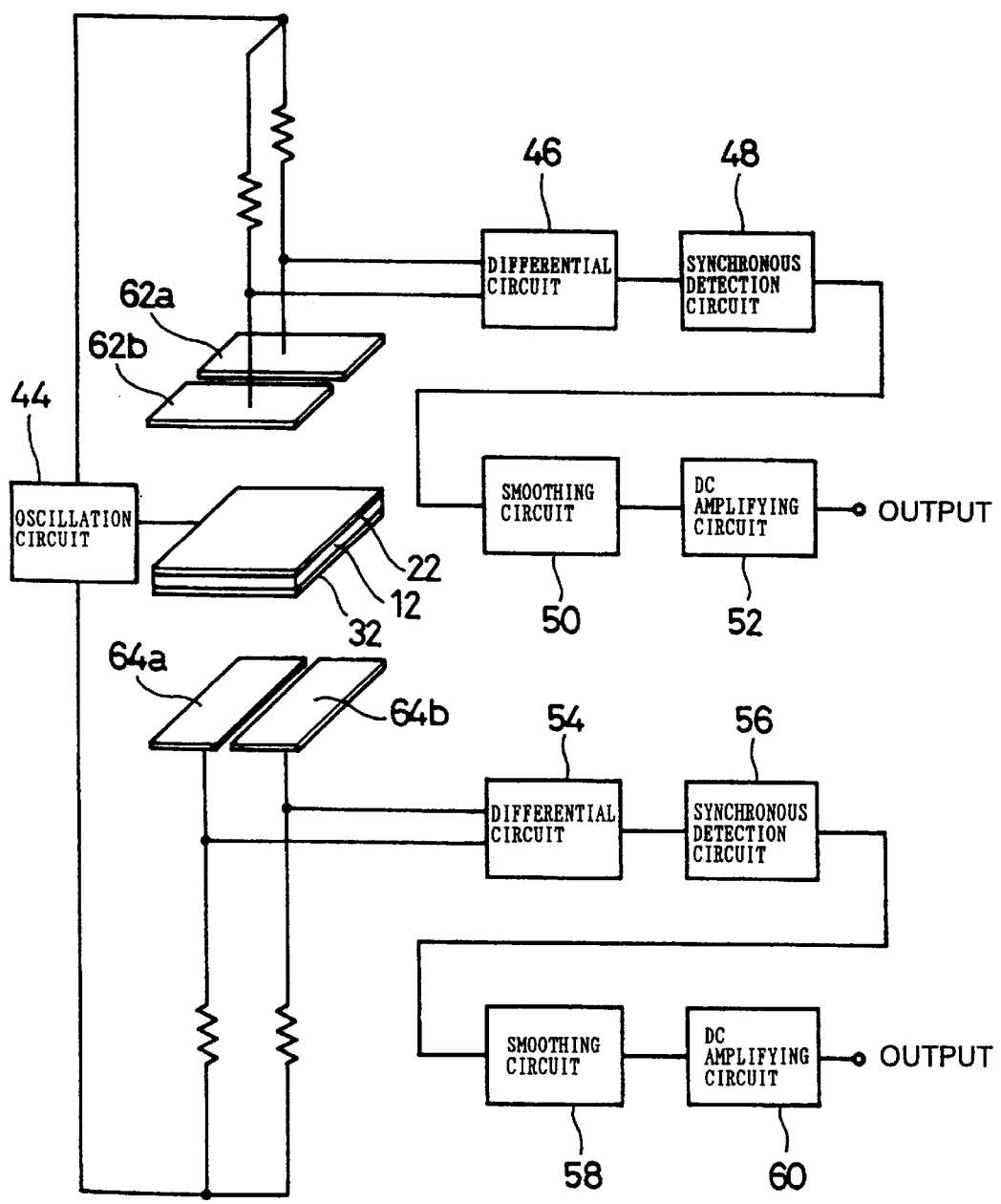
FIG. 10 is a schematic view of circuits for modified configuration of electrodes.
Figure 11:
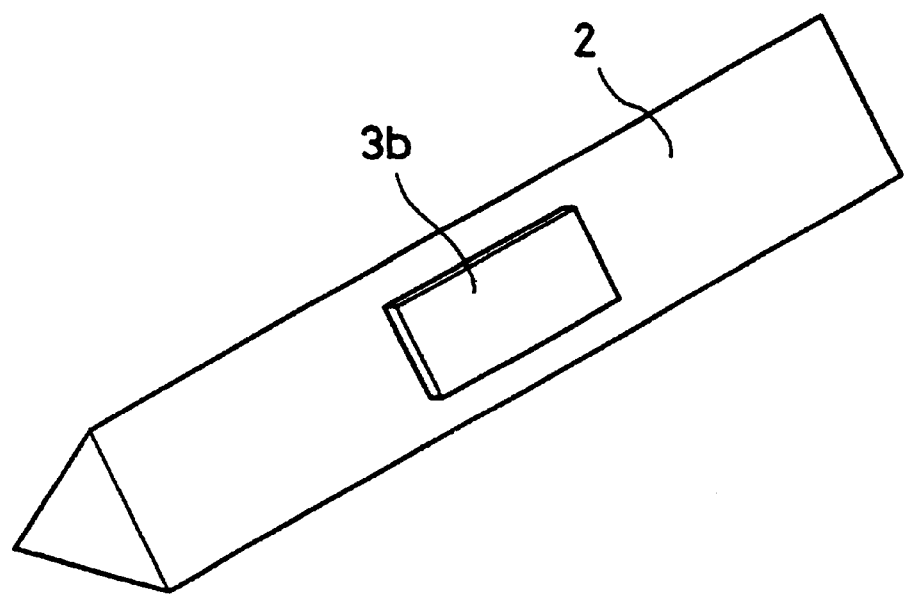
FIG. 11 is a perspective view of an example of conventional vibrating gyroscopes.
Figure 12:
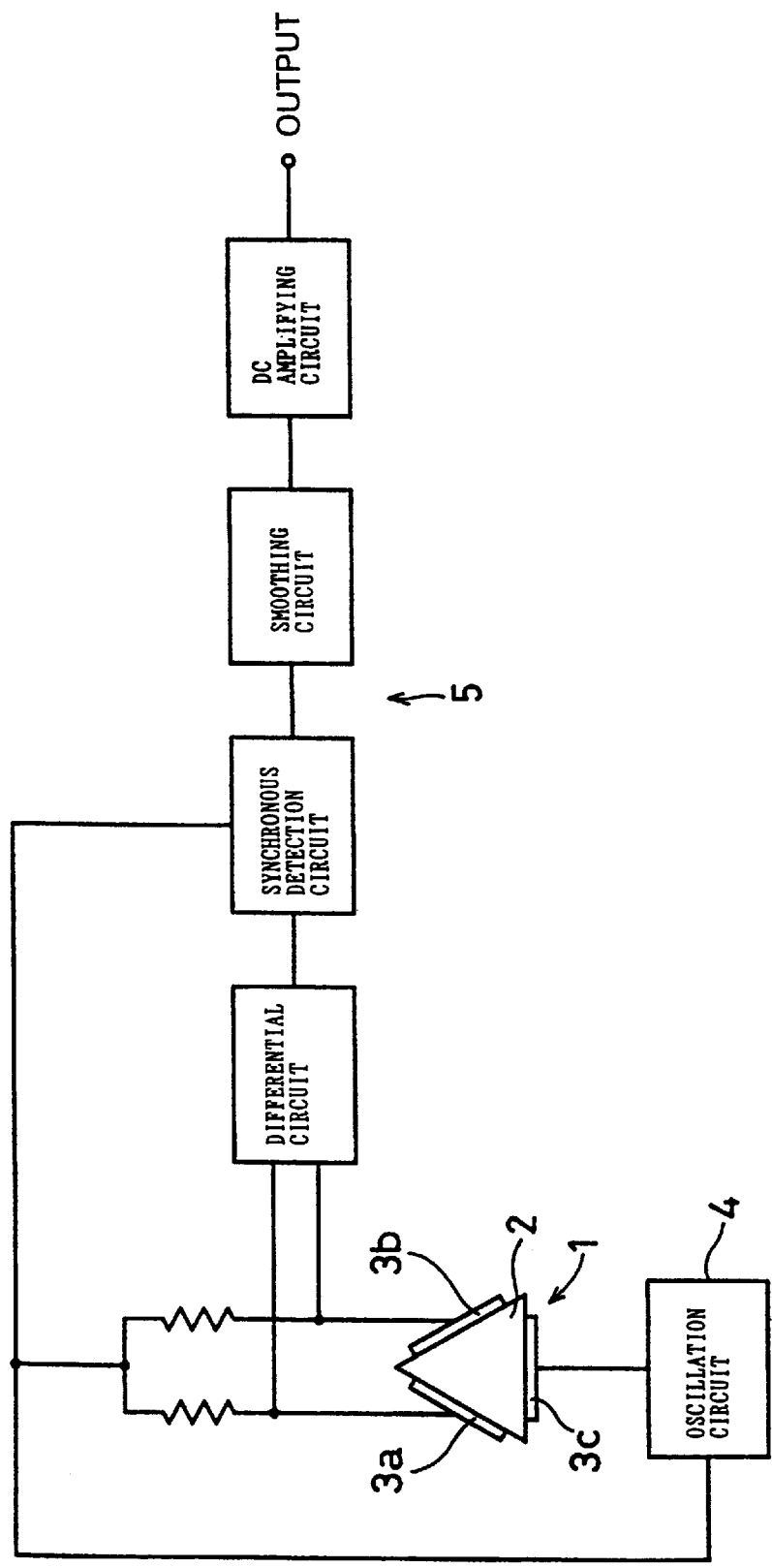
FIG. 12 is a schematic view of circuits for using the conventional vibrating gyroscope shown in FIG. 11.
Figure 13:
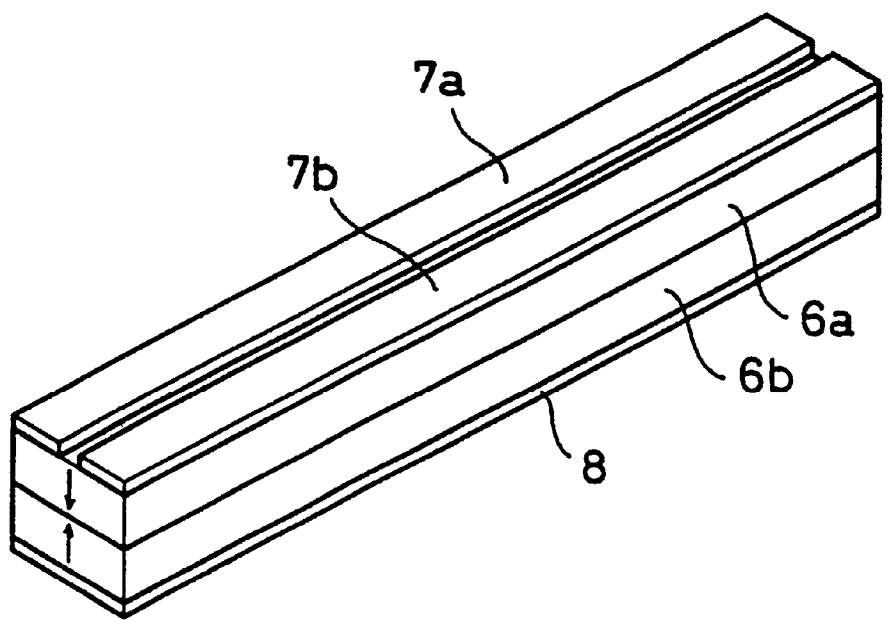
FIG. 13 is a perspective view of another example of conventional vibrating gyroscopes.

Also, as shown in FIG. 10, electrodes constituting each exciting and detecting element may be two sectional electrodes. Electrodes 62a and 62b formed on the side of a vibrating plate 14 and electrodes 64a and 64b formed on the side of a vibrating plate 24 are arranged perpendicular to each other. In this case, using the circuits shown in FIG. 10 allows intermediate member 12 to be excited, and also, allows detection of a signal corresponding to the angular velocity with respect to each of axes perpendicular to each other. In the described arrangement of the electrodes, as in the other cases, the electrodes 62a and 62b and the electrodes 64a and 64b are preferably formed in positions corresponding to a spaced section where the intermediate member 12 does not exist.

For the vibrating plates, for example, metal plates may be used instead of piezoelectric substrates. In this case, for the exciting and detecting element, piezoelectric elements each having electrodes on two surfaces of a piezoelectric layer may be used. At this time, the piezoelectric elements are arranged similarly either to the electrodes 20a, 20b, 20c, and 20d and the electrodes 30a, 30b, 30c, and 30d shown in FIG. 1 or to the electrodes 62a and 62b and the electrodes 64a and 64b shown in FIG. 10. As a matter of course, no piezoelectric elements need be formed in positions corresponding to peripheral electrodes around the aforementioned electrodes. In this case, an intermediate member 12 may be formed of the same metal material as used for the vibrating plates 14 and 24. The intermediate member 12 thus formed is connected to a vibration circuit 44, thereby allowing connection of the electrodes on one of the sides of each of the piezoelectric elements to the vibration circuit 44.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising two planar vibrating plates arranged to oppose each other, wherein the two vibrating plates vibrate under buckling vibration mode and a second-order bending vibration mode which is degenerated with or close to the buckling vibration mode, and the vibrating gyroscope detects Coriolis force by detecting displacements in amplitude balance of the second-order bending vibration modes generated when an angular rotation velocity around an axis parallel to surfaces of the vibrating plates is applied.

2. The vibrating gyroscope according to claim 1, comprising:
   an intermediate member formed between the two vibrating plates to form a spaced section between the two vibrating plates, and
   a plurality of exciting and detecting elements formed on the vibrating plates to vibrate the vibrating plates and to output signals generated by vibrations of the vibrating plates,
   wherein a first detecting section comprises a combination of two adjacent exciting and detecting elements, a second detecting section comprises another combination of two different adjacent exciting and detecting elements, and the first detecting section and the second detecting section are arranged perpendicular to each other.

3. The vibrating gyroscope according to claim 2, wherein the exciting and detecting elements are formed in positions opposing the spaced section, but not opposing the intermediate member.

4. The vibrating gyroscope according to claim 2, wherein the individual exciting and detecting elements comprises piezoelectric substrates having electrodes sectioned crosswise thereon.

5. The vibrating gyroscope according to claim 2, wherein each of the individual exciting and detecting elements comprises piezoelectric substrate having four electrodes thereon.

6. The vibrating gyroscope according to claim 2, wherein each vibrating plate is formed of a metal plate, and the exciting and detecting elements comprise piezoelectric elements sectioned crosswise into four formed on each metal plate.

7. The vibrating gyroscope according to claim 2, wherein the intermediate member is formed of a frame member having a through-opening in its central portion.

8. The vibrating gyroscope according to claim 2, wherein the intermediate member is formed of multiple members arranged on multiple end portions of the vibrating plates.

9. The vibrating gyroscope according to claim 7, wherein the individual exciting and detecting elements are formed in positions opposing the through-opening.

10. The vibrating gyroscope according to claim 2, further including a circuit for applying an oscillation signal to the exciting and detecting elements to vibrate the vibrating plates and a circuit for detecting detection signals from the first and second detecting sections.

* * * * *